US011365270B2

(12) United States Patent
Krannig et al.

(10) Patent No.: US 11,365,270 B2
(45) Date of Patent: Jun. 21, 2022

(54) POLYBUTADIENE, PRODUCTION AND USE THEREOF

(71) Applicant: Evonik Operations GmbH, Essen (DE)

(72) Inventors: Kai-Steffen Krannig, Dortmund (DE); Jürgen Herwig, Hünxe (DE); Andreas Berlineanu, Marl (DE); Miriam Ammer, Recklinghausen (DE); Philip Kemper, Ahaus (DE); Alexander Pschantka, Coesfeld (DE); Yvonne Groß-Onnebrink, Raesfeld (DE); Gudula Beuers, Dülmen (DE); Margit Bukohl, Marl (DE); Kirsten Luce, Herne (DE); Siegfried Jittenmeier, Marl (DE)

(73) Assignee: Evonik Operations GmbH, Essen (DE)

( * ) Notice: Subject to any disclaimer, the term of this patent is extended or adjusted under 35 U.S.C. 154(b) by 31 days.

(21) Appl. No.: 17/066,921

(22) Filed: Oct. 9, 2020

(65) Prior Publication Data
US 2021/0024666 A1 Jan. 28, 2021

Related U.S. Application Data

(62) Division of application No. 16/469,855, filed as application No. PCT/EP2018/050942 on Jan. 16, 2018, now Pat. No. 10,851,189.

(30) Foreign Application Priority Data

Jan. 16, 2017 (EP) ..................... 17151585

(51) Int. Cl.
*C08F 36/06* (2006.01)
*C08F 4/609* (2006.01)
*C08F 4/619* (2006.01)
*C08F 4/70* (2006.01)
*C08F 2/06* (2006.01)
*C08L 9/00* (2006.01)

(52) U.S. Cl.
CPC ............... *C08F 36/06* (2013.01); *C08F 2/06* (2013.01); *C08F 4/6097* (2013.01); *C08F 4/61912* (2013.01); *C08F 4/7096* (2013.01); *C08L 9/00* (2013.01)

(58) Field of Classification Search
CPC .... C08F 36/06; C08F 4/6097; C08F 4/61912; C08F 4/7096
See application file for complete search history.

(56) References Cited

U.S. PATENT DOCUMENTS 3,040,016 A 6/1962 Balas et al.
3,778,424 A 12/1973 Hamada
3,966,697 A 6/1976 Kampf et al.
3,983,183 A 9/1976 Kampf
4,751,275 A 6/1988 Witte et al.
5,548,045 A * 8/1996 Goto ............... C08F 136/06
526/161
6,291,591 B1 9/2001 Luo
6,797,787 B2 9/2004 Scholz et al.
8,034,848 B2 10/2011 Landers et al.
8,530,582 B2 9/2013 Becker et al.
8,802,782 B2 8/2014 Becker et al.
8,921,489 B2 12/2014 Becker et al.
9,982,085 B2 5/2018 Landers et al.
2012/0190762 A1 7/2012 Hubel et al.
2013/0338324 A1 12/2013 Beierlein et al.
2015/0183904 A1 7/2015 Tamaki et al.
2015/0307640 A1 10/2015 Berlineanu et al.
2017/0174956 A1 6/2017 Ramon-Gimenez et al.
2018/0118926 A1 5/2018 Haberkorn et al.

FOREIGN PATENT DOCUMENTS

| CN | 104428323 A | 3/2015 |
|---|---|---|
| DE | 2261782 A1 | 6/1974 |
| DE | 10 2006 038661 A1 | 2/2008 |
| EP | 0 511 015 A1 | 10/1992 |
| EP | 2 481 770 A2 | 8/2012 |
| JP | S50-161585 A | 12/1975 |
| JP | S51 30287 A | 3/1976 |

(Continued)

OTHER PUBLICATIONS

Cray Valley bdR-45HTLO Technical Data Sheet, copyright 2010 (1 page).
German language International Search Report dated Apr. 26, 2018 in PCT/EP2018/050942 (6 pages).
German language Written Opinion dated Apr. 26, 2018 in PCT/EP2018/050942 (9 pages).
International Search Report dated Apr. 26, 2018 in PCT/EP2018/050942 (3 pages).
European Search Report dated May 25, 2020 in EP 19207810.3 (6 pages).

*Primary Examiner* — Catherine S Branch
(74) *Attorney, Agent, or Firm* — Taylor English Duma LLP; Philip P. McCann

(57) ABSTRACT

The invention relates to polybutadiene, which contains the monomer units derived from 1,3-butadiene having a vinyl double bond in a proportion of 25 to 75 mole percent, having a trans-double bond in a proportion of 0 to 10 mole percent and a cis-double bond in a proportion of 25 to 75 mole percent, wherein the totality of the monomer units (A), (B) and (C) is supplemented to 100 mole percent, and which is characterized in that it has a number-average mole mass of 1,000 to 3,000 g/mole. The invention further relates to a method for producing polybutadienes, the use of the polybutadiene according to the invention and compositions containing polybutadiene according to the invention.

20 Claims, No Drawings

(56) References Cited

FOREIGN PATENT DOCUMENTS

| | | |
|---|---|---|
| JP | H06 116315 A | 4/1994 |
| JP | H06 116317 A | 4/1994 |
| JP | 2000 072823 A | 3/2000 |
| KR | 2002 0089764 A | 11/2002 |
| SU | 533326 A3 | 10/1976 |
| WO | 2014/146888 A1 | 9/2014 |
| WO | 2016/180649 A1 | 11/2016 |

* cited by examiner

POLYBUTADIENE, PRODUCTION AND USE THEREOF

This application is a divisional application of U.S. application Ser. No. 16/469,855 filed Jun. 14, 2019, currently pending, which claims the benefit of International Application No. PCT/EP2018/050942 filed on Jan. 16, 2018 and European Application No. EP 17151585.1 filed on Jan. 16, 2017, the disclosures of which are expressly incorporated herein by reference.

FIELD

The present invention relates to polybutadiene comprising the monomer units derived from 1,3-butadiene having vinylic double bonds (formula (A) as defined below) at a proportion of 25 to 75 mole percent, having trans double bonds (formula (B) as defined below) at a proportion of 0 to 10 mole percent and having cis double bonds (formula (C) as defined below) at a proportion of 25 to 75 mole percent, with the proviso that the entirety of the monomer units (A), (B) and (C) add up to 100 mole percent and which is characterized in that said polybutadiene has a number-average molar mass of 1000 to 3000 g/mol, to a method for preparing polybutadienes, to the use of the polybutadienes according to the invention and also to compositions comprising polybutadienes according to the invention.

BACKGROUND

The preparation of liquid polybutadienes by means of Ziegler-Natta catalysts has been known since the 1960s, e.g. from U.S. Pat. No. 3,040,016. Since then, a multiplicity of transition metals have been investigated, such as nickel, titanium, vanadium, chromium, molybdenum and cobalt (U.S. Pat. Nos. 4,751,275; 3,778,424; 6,291,591). By selecting the appropriate transition metal, the polymer properties such as molecular weight and microstructure can be specifically adjusted.

Polybutadienes comprising vinyl groups, by means of these, may be crosslinked with itself or with other compounds, which is why polybutadienes are used, for example, as components, such as plasticizers, in the preparation of rubber or synthetic rubber, or as coating agents or coating agent components.

Liquid polybutadienes having relatively high vinyl contents (25 to 75 mole percent as defined below) are becoming increasingly important since they can be crosslinked by peroxide and thus the use of sulfur for vulcanization can be reduced or sulfur can be wholly dispensed with.

DE 2,261,782 describes a method for preparing such a liquid polybutadiene using cobalt in combination with an organic phosphorus species, an alkylaluminium halide and water. A substantial disadvantage of the method is that the amount of butadiene required is initially fully charged such that, on incorrect metering, a high energy potential and therefore risk potential exists. Such a reaction regime is no longer feasible under today's safety standards. Moreover, the required run times of the reaction described are very long (5 h) and the monomer concentrations (12.9% butadiene in benzene) are very low, which leads to low space-time yields and has therefore to date prevented economic production.

SUMMARY

The object of the present invention therefore was to provide an improved method for preparing liquid polybutadienes having a vinyl content of greater than 25 mole percent (25 mole percent of monomer units (A) as defined below).

Surprisingly, it has been found that this object can be achieved by polybutadienes and a method for the preparation thereof as defined below and in the claims.

The present invention therefore relates to polybutadiene, to a method for preparing polybutadiene, to the use of the polybutadienes according to the invention and also to compositions comprising polybutadienes according to the invention, as defined below and in the claims.

DETAILED DESCRIPTION

The polybutadienes according to the invention have the advantage that they can be prepared more safely and, due to the relatively high space-time yield, with lower use of resources (solvent, energy).

The preferred molecular weight according to the invention of the liquid polybutadienes according to the invention favors achieving the required curing rates when used in adhesive formulations.

The polybutadienes according to the invention also have the advantage that they are liquid at 20° C. and standard pressure and preferably have a viscosity at this temperature in the range of 2000 to 8000 mPa s, whereby the processing and metered addition is easily possible, particularly in the production of synthetic rubber compositions, rubber compositions and adhesive compositions.

The method according to the invention has the advantage that, when using significantly lower temperatures, higher conversions can be achieved in a shorter time. Furthermore, the method according to the invention has an improved temperature regime.

A further advantage of the method according to the invention is that the amount of butadiene required can be metered in continuously and thus a safer process regime is enabled.

The method according to the invention also enables the use of a reaction solution having a distinctly higher proportion of butadiene in the reaction solution, whereby higher space-time yields can be achieved.

The polybutadiene according to the invention, the method according to the invention for producing the preparations and the use of the polybutadiene according to the invention are described below by way of example, without any intention that the invention be limited to these illustrative embodiments. When ranges, general formulae or classes of compounds are specified below, these are intended to encompass not only the corresponding ranges or groups of compounds which are explicitly mentioned but also all subranges and subgroups of compounds which can be obtained by leaving out individual values (ranges) or compounds. Where documents are cited in the context of the present description, their content shall fully form part of the disclosure content of the present invention, particularly in respect of the matters referred to. Percentages specified hereinbelow are by weight unless otherwise stated. Average values, molar mass average values for example, specified hereinbelow are number averages unless otherwise stated. Where properties of a material are referred to hereinafter, for example viscosities or the like, these are the properties of the material at 25° C., unless stated otherwise. Where chemical (empirical) formulae are used in the present invention, the specified indices may be not only absolute numbers but also average values. The indices relating to polymeric compounds are preferably average values.

In the context of the present invention, the term "polybutadiene" is to be understood as meaning a product obtainable by polymerization of monomer units each having at least two conjugated double bonds, wherein, in order of increasing preference, at least 80, 85, 90, 95, 98, 99 or 99.9% of the monomer units, preferably exclusively, are 1,3-butadiene. Possible further compounds (impurities) may be, e.g. alkanes or alkenes having 3 to 5 carbon atoms, in particular propene, 1-butene or 1,2-butadiene.

Polybutadiene according to the invention comprising the monomer units derived from 1,3-butadiene

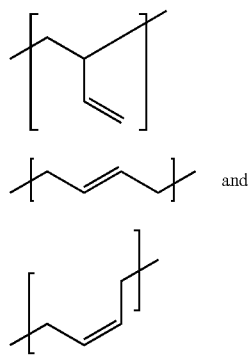

is characterized in that the proportion of units of the formula (A) in the entirety of the monomer units derived from 1,3-butadiene present in the polybutadiene is 25 to 75 mole percent, preferably 50 to 65 mole percent and preferably 59 to 62 mole percent, the proportion of units of the formula (B) in the entirety of the monomer units derived from 1,3-butadiene present in the polybutadiene is 0 to 10 mole percent, preferably 1 to 8 mole percent and preferably 2 to 6 mole percent, and the proportion of units of the formula (C) in the entirety of the monomer units derived from 1,3-butadiene present in the polybutadiene is 25 to 75 mole percent, preferably 25 to 40 mole percent and preferably 35 to 39 mole percent, with the proviso that the entirety of all monomer units (A), (B) and (C) add up to 100 mole percent, and the polybutadiene has a number-average molar mass of 1000 to 3000 g/mol, preferably 1100 to 1800 g/mol and preferably 1200 to 1700 g/mol.

In the monomer units shown with the formulae (A), (B) and (C), where a square bracket in the formula representation chosen in this application shows the monomer units (A), (B) and (C) derived from 1,3-butadiene present in the polybutadiene, the bonds marked with the respective square bracket do not end with a methyl group, for instance; instead, the relevant monomer units are bonded via this bond to another monomer unit. The monomer units (A), (B) and (C) may be arranged in the polymer in any desired sequence in this case. A random arrangement is preferred.

The proportion of the monomer units in the polybutadiene according to the invention, which do not conform to any of the formulae (A), (B) or (C), is preferably less than 20 mole percent, preferably less than 5 mole percent, particularly preferably less than 1 mole percent and especially preferably less than 0.1 mole percent, based on the entirety of the monomer units. The proportion of the monomer units in the polybutadiene according to the invention, which do not conform to any of the formulae (A), (B) or (C), may be controlled in the production process by using 1,3-butadiene which accordingly comprises preferably less than 20 mole percent, preferably less than 5 mole percent, particularly preferably less than 1 mole percent and especially preferably less than 0.1 mole percent of impurities, particularly of dienes which are not 1,3-butadiene.

The molar proportions of the monomer units according to the formulae (A), (B) and (C) are determined by IR spectroscopy relative to polybutadiene standards. For this purpose, the samples (ca. 80 to 250 mg) are dissolved in 10 ml of carbon disulfide ($CS_2$). In the case of high vinyl content low concentrations are used and at high cis content higher concentrations are used. The measurements are carried out in IR cuvettes with NaCl windows and 0.5 mm path length. The solvent is subtracted and the spectrum is shown as absorbance in the evaluation range 1100 to 600 $cm^{-1}$. At absorbances above 1, the measurement is repeated with a lower concentration. The absorbances above baselines of the following signals are determined:

trans-1,4-polybutadiene: 968 $cm^{-1}$
1,2-polybutadiene: 911 $cm^{-1}$
cis-1,4-polybutadiene: 730 $cm^{-1}$ The molar proportions of the monomer components are given by $$\% \text{ comp}(i) = Ext(i)*100\%/(E(i)*c*d*)$$

where
$Ext(i)$=absorbance above baseline
$E(i)$=extinction coefficient (substance specific, to be determined by calibration) $[E]=L/(g*cm)$
$d$=path length of the cuvette in cm
$c$=concentration of the sample in g/L The number/weight-average molar mass and the dispersity are determined by gel permeation chromatography (GPC):

Measurements were carried out at 40° C. in tetrahydrofuran (THF) at a concentration of 1 g/l and a flow rate of 0.3 ml/min. Chromatographic separation was achieved using a PSS SDV Micro 5μ/4.6×30 mm precolumn and a PSS SDV Micro linear S 5μ/4.6×250 mm (2×) separation column. Detection was by means of an RI detector. Calibration was carried out by means of polybutadiene standards (PSS-Kit polybutadiene-1,4, Mp 831-106000, Part No.: PSS-bdfkit, Mn: 1830/4330/9300/18000/33500).

The polybutadiene according to the invention preferably has a viscosity at 20° C. of 2000 to 8000 mPa s, preferably of 3000 to 6500 mPa s. The viscosity (cone-plate) was determined to DIN 53018 with a Rheometer Physica MCR 301 from ANTON PAAR Germany GmbH.

It may be advantageous if the polybutadiene according to the invention has a dispersity of 2.1 to 3.0, preferably 2.5 to 3.0, preferably 2.6 to 2.9. The dispersity is defined as number-average molar mass (Mn) divided by weight-average molar mass (Mw).

Preferred polybutadienes according to the invention have a viscosity of 2000 to 8000 mPa s, preferably of 3000 to 6500 mPa s and a dispersity of 2.1 to 3.0, preferably 2.6 to 2.9.

Particularly preferred polybutadienes according to the invention are those in which the proportion of units of the formula (A) in the entirety of the monomer units derived from 1,3-butadiene present in the polybutadiene is 50 to 65 mole percent and preferably 59 to 62 mole percent, the proportion of units of the formula (B) in the entirety of the monomer units derived from 1,3-butadiene present in the polybutadiene is 1 to 8 mole percent and preferably 2 to 6 mole percent, and the proportion of units of the formula (C) in the entirety of the monomer units derived from 1,3-butadiene present in the polybutadiene is 25 to 40 mole percent and preferably 35 to 39 mole percent, with the proviso that the entirety of the monomer units (A), (B) and (C) add up to 100 mole percent and the polybutadiene has a number-average molar mass of 1100 to 1800 g/mol, preferably 1200 to 1700 g/mol. Very particular preference is given to these polybutadienes according to the invention when they have a viscosity of 2000 to 8000 mPa s, preferably of 3000 to 6500 mPa s and a dispersity of 2.1 to 3.0, preferably 2.6 to 2.9 and the proportion of the monomer units which do not conform to any of the formulae (A), (B) or (C) is less than 5 mole percent, preferably less than 1 mole percent, particularly preferably less than 0.1 mole percent and especially preferably 0 mole percent, based on the entirety of the monomer units.

The polybutadiene according to the invention is preferably obtained by the method for preparing polybutadiene according to the invention described below.

The method for preparing polybutadienes according to the invention by polymerizing 1,3-butadiene in the presence of a solvent and a catalyst system comprising a cobalt compound, an organoaluminium compound, an organophosphorus compound and water is characterized in that a mixture of catalyst system and solvent is initially charged and the 1,3-butadiene is metered into this mixture.

The 1,3-butadiene used may comprise exclusively 1,3-butadiene or also 1,3-butadiene comprising impurities. Preference is given to using 1,3-butadiene having less than 20 mole percent, preferably less than 5 mole percent, particularly preferably less than 1 mole percent and especially preferably less than 0.1 mole percent of impurities, particularly of dienes which are not 1,3-butadiene as impurities.

In the method according to the invention, the solvent may be selected in particular from those of the group comprising aliphatics, aromatics, esters and ethers which are in each case liquid at room temperature. In one preferred embodiment, the solvent is a room-temperature-liquid aliphatic, for example hexane, heptane, octane, cyclohexane, a room-temperature-(25° C.)-liquid aromatic, for example benzene, toluene, a room-temperature-liquid ester, for example ethyl acetate, butyl acetate, or a room-temperature-liquid ether, for example diethyl ether or diisopropyl ether, dioxane or tetrahydrofuran. Solvent mixtures of the solvents mentioned are possible in any desired quantitative ratios. The solvent used is preferably a room-temperature-liquid aliphatic, preferably hexane, heptane, octane or cyclohexane, or a room-temperature-liquid aromatic, preferably benzene or toluene. Particular preference is given to using benzene as solvent. The proportion of the solvent in the reaction mixture is preferably 25 to 75% by mass, preferably 40 to 70% by mass and particularly preferably 45 to 60% by mass, based on the mass of the reaction mixture.

The metered addition of the 1,3-butadiene is preferably effected in portions or continuously in such a manner that, after half of the entire period of the metered addition, 25 to 60%, preferably 40 to 55%, preferably 50% of the amount of 1,3-butadiene to be metered in has been added to the mixture. The metered addition is preferably effected in equal portions with uniform frequency, i.e. quasi-continuously or continuously.

The polymerization is preferably carried out over a period of 0.5 to 20 hours, preferably 1 to 10 hours and particularly preferably 2.5 to 4 hours.

In the method according to the invention, the polymerization is preferably carried out at a pressure of 2 to 8 bar, preferably 3 to 7 bar. An inert gas is preferably used to regulate the pressure. In the context of the present invention, the term "inert gas" signifies a gas or gas mixture, the entirety of which is inert. It is preferable that the inert gas used is nitrogen, noble gases or mixtures thereof, particularly preferably nitrogen.

The polymerization is carried out preferably at a temperature of the reaction mixture of 20 to 60° C., preferably 25 to 40° C. and preferably 30° C. It is therefore preferable to carry out the polymerization in a reactor which is equipped with appropriate means to be able to regulate the temperature of the reaction mixture, for example heat exchangers.

Particular preference is given to conducting the polymerization at a pressure of 2 to 8 bar, preferably 3 to 7 bar and a temperature of the reaction mixture of 20 to 60° C., preferably 25 to 40° C. and preferably 30° C.

In the method according to the invention, it is possible to use all suitable cobalt compounds, particularly organic cobalt compounds, as catalyst system. A catalyst system is preferably used having, as cobalt compound, cobalt 2-ethylhexanoate, cobalt chloride or cobalt acetylacetonate, preferably cobalt 2-ethylhexanoate or cobalt acetylacetonate, particularly preferably cobalt 2-ethylhexanoate.

The organophosphorus compounds used can be, for example, phosphines such as triphenylphosphine or phosphites. In particular, the organophosphorus compounds may be those of the general formula $P(OR^1)(OR^2)(OR^3)$ where $R^1$, $R^2$ and $R^3$ are the same or different alkyl, alkenyl, phenyl, tolyl or benzyl radicals. Preferred alkyl radicals are straight-chain, branched or cyclic radicals having 1 to 12 carbon atoms such as methyl, ethyl, propyl, isopropyl, butyl, isobutyl, hexyl, octyl, cyclohexyl, nonyl, decanyl, undecanyl and dodecanyl. In the method according to the invention, preference is given to using trimethyl, triethyl, tripropyl, tricyclohexyl, triallyl, triphenyl, diphenylethyl, diphenylallyl, diphenylbutyl, diethylphenyl or dibutylphenyl phosphite. The organophosphorus compound used is particularly preferably tris(2,4-d-tert-butylphenyl) phosphite or tris(ortho-phenylphenyl) phosphite.

The organoaluminium compound used may be all suitable organoaluminium compounds. Preference is given to using dimethylaluminium chloride, diethylaluminium chloride, diisobutylaluminium chloride or ethylaluminium sesquichloride, preferably diethylaluminium chloride or ethylaluminium sesquichloride.

Preferred catalyst systems comprise all of the above-mentioned preferably, particularly preferably or especially preferably used components.

The amount of catalyst system is preferably calculated such that the molar ratio of cobalt compound to total amount of 1,3-butadiene used is from 1:2500 to 1:15 000, preferably from 1:5000 to 1:7500 and preferably from 1:5500 to 1:6500.

The polymerization is preferably carried out such that a conversion of 50%, preferably a conversion of 70% and particularly preferably of greater than 80% is obtained, based on the monomers used. This can be achieved in particular by carrying out the metered addition of the 1,3-butadiene portionwise or continuously in the preferred manner described above.

At the end of the polymerization, it can be advantageous to terminate the polymerization reaction. This is preferably effected by quenching. The quenching agent used may be, for example, water or methanol. An amount of quenching agent, preferably water, is preferably used such that the ratio by volume of quenching agent to the reaction mixture is from 0.005:1 to 1:0.1, preferably from 0.01:1 to 1:0.5 and particularly preferably from 0.05:1 to 1:0.75.

The reaction mixture obtained after polymerization, which optionally may comprise a quenching agent, is preferably processed in order to separate the polybutadiene from one or more of the constituents of the reaction mixture. The polybutadiene is preferably separated from all other constituents present in the reaction mixture.

The separation is effected preferably in two stages. In a first stage, a separation into organic and aqueous phase is preferably carried out. In a second stage, a separation of the organic phase is carried out. This can be effected, for example, by thermal separation methods, by distillative treatment of the organic phase for example or by treatment of the organic phase in a rotary evaporator, falling film evaporator or thin-film evaporator. The thermal separation method may be carried out at atmospheric pressure or subatmospheric pressure. The thermal separation method is preferably carried out at subatmospheric pressure, for example under waterjet pump vacuum or oil pump vacuum, preferably at a pressure less than 1 $mbar_{abs}$.

The method according to the invention can be carried out using customary commercially available apparatuses. The apparatuses used can be, for example, those composed of glass or steel, particularly stainless steel (e.g. V2A or V4A steel). Those which may be used are, for example, glass or metal reactors with jacket temperature control via thermostat with stirred reactor or temperature control via an external circuit (loop reactor), flash vessel, separating funnel and/or pressure filtration systems.

Using the method according to the invention, polybutadienes can be prepared, particularly the polybutadienes according to the invention described above.

The polybutadienes according to the invention may be used, for example, for preparing rubber, synthetic rubber, tyres, adhesive formulations, flexographic printing plates, coating agents, coating compositions, coating agent components, in the recycling of rubber and as plasticizers.

Corresponding compositions according to the invention are therefore those comprising the polybutadienes according to the invention or conversion products of polybutadienes according to the invention with other compounds.

Preferred compositions according to the invention are those in which the proportion of the polybutadienes which are present in the composition or were used for preparing the conversion products, based on the composition, is from 0.1 to 90% by weight, preferably from 1 to 50% by weight and particularly preferably from 5 to 40% by weight.

Even without further elaboration it is believed that a person skilled in the art will be able to make the widest use of the above description. The preferred embodiments and examples are therefore to be interpreted merely as a descriptive disclosure which is by no means limiting in any way whatsoever.

The present invention is further illustrated in detail below by means of examples without being limited thereto. Alternative embodiments of the present invention are obtainable analogously.

EXAMPLES

Example 1

In a 5 L metal reactor, 980 ml of benzene, 1.48 mmol of Co(2-ethylhexanoate), 3.03 mmol of triphenyl phosphite and 27.6 mmol of water were combined.

Using nitrogen, the pressure in the reaction vessel was increased to 3.5 bar and 11.85 mol of butadiene were rapidly metered in. After addition was complete, 29.51 mmol of diethylaluminium chloride were added and the reaction mixture was stirred for 4 h and the temperature kept constant at ca. 50° C. by means of a jacket cooler and thermostat. To terminate the polymerization, the reaction mixture was quenched with 600 ml of water and remaining butadiene purged by means of nitrogen.

The organic phase was separated from the aqueous phase, filtered and freed from solvent on the rotary evaporator or by means of a thin-film evaporator under reduced pressure (p<1 mbar, T=130° C.).

Example 2

In a 5 L metal reactor, 982 ml of benzene, 2.01 mmol of Co(2-ethylhexanoate), 6.03 mmol of tris(2,4-di-tert-butylphenyl) phosphite, 19.22 mmol of water and 16.28 mmol of ethylaluminium sesquichloride were combined and stirred at room temperature for 10 min.

Using nitrogen, the pressure in the reaction vessel was increased to 3.5 bar and 11.84 mol of butadiene was metered in continuously over a period of 2.4 h. The reaction mixture was kept at a constant temperature of ca. 30° C. during the course of the reaction via thermostat by means of a jacket cooler. After completion of the addition, the reaction mixture was stirred for a further 5 min. To terminate the polymerization, the reaction mixture was quenched with 1000 ml of water and remaining butadiene purged by means of nitrogen.

The organic phase was separated from the aqueous phase, filtered and freed from solvent on the rotary evaporator or by means of a thin-film evaporator under reduced pressure (p<1 mbar, T=130° C.).

Example 3

In a 5 L metal reactor, 1403 ml of benzene, 3.01 mmol of Co(2-ethylhexanoate), 10.22 mmol of tris(2,4-di-tert-butylphenyl) phosphite, 24.81 mmol of water and 27.15 mmol of ethylaluminium sesquichloride were combined and stirred at room temperature for 10 min.

Using nitrogen, the pressure in the reaction vessel was increased to 3.5 bar and 17.76 mol of butadiene was metered in continuously over a period of 3.5 h. The reaction mixture was kept at a constant temperature of ca. 28° C. during the course of the reaction via thermostat by means of a jacket cooler. After completion of the addition, the reaction mixture was stirred for a further 20 min. To terminate the polymerization, the reaction mixture was quenched with 1500 ml of water and remaining butadiene purged by means of nitrogen.

The organic phase was separated from the aqueous phase, filtered and freed from solvent on the rotary evaporator or by means of a thin-film evaporator under reduced pressure (p<1 mbar, T=130° C.).

Comparative Example I

In a 5 L metal reactor, 1.933 ml of benzene, 3.91 mmol of Co(2-ethylhexanoate), 9.04 mmol of tris(2,4-di-tert-butylphenyl) phosphite, 30.37 mmol of water and 30.34 mmol of ethylaluminium sesquichloride were combined and stirred at room temperature for 10 minutes.

The pressure in the reaction vessel was increased to 3.5 bar by means of nitrogen and 23.13 mol of butadiene were added continuously over a period of 2.5 h. The reaction mixture was maintained via thermostat at a constant temperature of ca. 20° C. during the course of the reaction by means of a jacketed cooler. After addition was complete, the reaction mixture was stirred for a further 20 minutes. To terminate the polymerisation, the reaction mixture was quenched with 1250 ml of water and remaining butadiene driven out by means of nitrogen.

The organic phase was separated from the aqueous phase, filtered and freed from solvent on a rotary evaporator or a thin-film evaporator in a vacuum (p<1 mbar, T=130° C.).

Comparative Example II

In a 5 L metal reactor, 1.942 ml of benzene, 3.91 mmol of Co(2-ethylhexanoate), 13.32 mmol of tris(2,4-di-tert-butylphenyl) phosphite, 29.86 mmol of water and 30.02 mmol of ethylaluminium sesquichloride were combined and stirred at room temperature for 10 minutes.

The pressure in the reaction vessel was increased to 3.5 bar by means of nitrogen and 23.12 mol of butadiene were added continuously over a period of 2.5 h. The reaction mixture was maintained via thermostat at a constant temperature of ca. 45° C. during the course of the reaction by means of a jacketed cooler. After addition was complete, the reaction mixture was stirred for a further 20 minutes. To terminate the polymerisation, the reaction mixture was quenched with 1250 ml of water and remaining butadiene driven out by means of nitrogen.

The organic phase was separated from the aqueous phase, filtered and freed from solvent on a rotary evaporator or a thin-film evaporator in a vacuum (p<1 mbar, T=130° C.).

Some properties of the polybutadienes produced were determined as described above. The results are shown in Table 1a.

TABLE 1a

Properties of the polybutadienes produced

| # | 1,2-Vinyl [%] | 1,4-cis [%] | 1,4-trans [%] | Mn [g/mol] | Mw [g/mol] | D | Viscosity [mPa*s] | Conversion [%] |
|---|---|---|---|---|---|---|---|---|
| Example 1 | 59 | 37 | 4 | 1748 | 3921 | 2.24 | 3578 | 51.6 |
| Example 2 | 58 | 38 | 4 | 1526 | 4245 | 2.78 | 4432 | 81.7 |
| Example 3 | 61 | 36 | 3 | 1264 | 3628 | 2.87 | 5228 | 83.8 |
| Comparative example I | 52 | 44 | 4 | 3214 | 11 438 | 3.56 | 31 740 | 87.1 |
| Comparative example II | 61 | 37 | 2 | 893 | 2713 | 3.04 | 1570 | 62.0 |

As can be inferred from table 1a, the polybutadiene according to comparative examples has a viscosity which is considerably outside the region desirable for basic processing/application.

Example 4: Preparation of Adhesive Formulations

To investigate the properties in adhesive formulations, several reaction batches were conducted according to examples 1 and 2, combined and freed of residual solvent on the thin-film evaporator. Example 4 results from combining six individual experiments according to example 1 and example 5 from combining four individual experiments according to example 2. The product LITHERNE® PH from Synthomer was also used. The properties investigated are shown in Table 1b.

TABLE 1b

Properties of the polybutadienes investigated

| # | 1,2-Vinyl [%] | 1,4-cis [%] | 1,4-trans [%] | Mn [g/mol] | Mw [g/mol] | D | Viscosity [mPa*s] |
|---|---|---|---|---|---|---|---|
| Example 4 | 59 | 37 | 4 | 1571 | 3486 | 2.22 | 3531 |
| Example 5 | 58 | 38 | 4 | 1480 | 4018 | 2.71 | 4940 |
| LITHENE® PH = reference | 45 | 34 | 21 | 2653 | 6600 | 2.49 | 11 240 |

As can be inferred from Tables 1a and 1b, the polybutadienes prepared in accordance with the invention are characterized by a high 1,4-cis and low 1,4-trans content and also a low viscosity based on the high 1,2-vinyl content.

Some of the polybutadienes specified in Tables 1a and 1b were used in adhesive formulations and tested in comparison to the reference LITHENE® PH. For this purpose, the polybutadienes were mixed in a vacuum dissolver with the same amount of the raw materials customary for this application, such as ZnO, stearic acid, chalk, talc, sulfur, vulcanization accelerator, etc. The precise composition of the formulations tested are to be found in Table 2.

TABLE 2

Composition of the formulations (data in % by mass)

| Formulation | 1 | 2 |
|---|---|---|
| LITHENE ® PH (Synthomer) | 19 | — |
| Example 5 | — | 19 |
| POLYVEST ® MA 75 (Evonik Industries AG) | 4 | 4 |
| Polyisoprene LIR 50 (Kuraray liquid rubber) | 8 | 8 |
| IONOL ® LC (Raschig GmbH) | 1 | 1 |
| IRGAFOS ® 168 (BASFSE) | 0.2 | 0.2 |
| IRGANOX ® 1520 L (BASFSE) | 0.1 | 0.1 |
| Furnace black 101 (Orion Engineered Carbons GmbH) | 1 | 1 |
| Sulfur | 3.3 | 3.3 |
| ZnO | 3 | 3 |
| Stearic acid | 0.3 | 0.3 |
| CaO | 1 | 1 |

TABLE 2-continued

Composition of the formulations (data in % by mass)

| Formulation | 1 | 2 |
|---|---|---|
| Alpha Talc CT P (Alpha Calcit Füllstoff GmbH & Co. KG) | 6 | 6 |
| OMYACARB ® 2 AL (Omya) | 50 | 50 |
| VULKACIT ® DM/C (Lanxess) | 3 | 3 |
| VULKACIT ® ZBEC (Lanxess) | 0.1 | 0.1 |
| | 100 | 100 |

Example 5: Testing the Adhesive Formulations

The Shore A hardness is determined according to DIN 53505-A using the instrument SHOREdigital Shore Durometer A from BAQ GmbH on test specimens with 50 mm diameter and 6 mm thickness, more than 16 hours after vulcanization at 23° C. On each test specimen, a measurement was carried out each time at 6 different points. The Shore A hardnesses specified are mean values of the individual measurements.

The tensile strength and elongation at break were determined as follows:

Films with defined layer thickness of 3 mm were generated and crosslinked at 170° C. for 30 minutes. From said films, the actual test specimens of 15 mm width and ca. 100 mm length were cut. The tensile tests were carried out using the universal tester inspekt table 10kn-1EDC2/300W, TM Standard from Hegewald and Peschke. The testing was carried out according to DIN EN ISO 257 with a clamped length of 50 mm, at room temperature and a test speed of 5 mm/min. The results are shown in Table 3:

TABLE 3

Results of the tensile strength test and elongation at break test

| | 1 | 2 |
|---|---|---|
| Properties of the formulation | | |
| Viscosity [Pa s] at 23° C. 1[1/s] | 1432 | 839 |
| Baking conditions 30 minutes at 170° C. | | |
| Shore A hardness | 74 | 72 |
| Tensile strength [MPa] | 2.4 | 2.87 |
| Elongation at break [%] | 91 | 98 |

As can be seen from Table 3, formulation 2 based on example 5 has a distinctly lower viscosity and improved strength to elasticity behavior.

The tensile shear strength was determined as follows:

To determine the tensile shear strength, a surface area of 25×20 mm was bonded onto various substrates using the formulations 1 to 2 and crosslinked at 170° C. for 30 minutes.

The tensile shear tests were carried out using the universal tester inspekt table 10kn-1EDC2/300W, TM Standard from Hegewald and Peschke. The testing was carried out according to DIN EN 1465 at room temperature and a test speed of 5 mm/min. The results are shown in Table 4:

TABLE 4

Results of the tensile shear strength test

| | 1 | 2 |
|---|---|---|
| Properties of the formulation Baking conditions 30 min. 170° C. | | |
| Tensile shear strength on steel [MPa] | 2.63 | 3.0 |
| Tensile shear strength on galvanized steel [MPa] | 2.58 | 2.9 |
| Tensile shear strength on aluminium [MPa] | 2.44 | 2.7 |
| Tensile shear strength on electrodeposition paint [MPa] | 2.02 | 2.4 |

The results of the test are shown in Table 4. It is significant to note that the use of polybutadienes according to the invention or prepared according to the invention leads to better tensile shear strengths on all substrates mentioned than the reference which was prepared using methods according to the prior art.

The invention claimed is:

1. A method for preparing a polybutadiene comprising monomer units derived from 1,3-butadiene

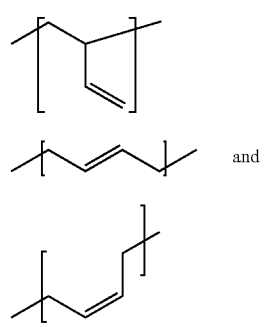

wherein the proportion of monomer units of the formula (A) in the entirety of the monomer units derived from 1,3-butadiene present in the polybutadiene is 25 to 75 mole percent, the proportion of units of the formula (B) in the entirety of the monomer units derived from 1,3-butadiene present in the polybutadiene is from 2 to 6 mole percent and the proportion of monomer units of the formula (C) in the entirety of the monomer units derived from 1,3-butadiene present in the polybutadiene is 25 to 75 mole percent, wherein the entirety of the monomer units (A), (B) and (C) add up to 100 mole percent, and the polybutadiene has a number-average molar mass of 1000 to 3000 g/mol, the method comprising the step of polymerizing 1,3-butadiene in the presence of a solvent and a catalyst system comprising a) a cobalt compound, b) an organoaluminium compound, c) an organophosphorus compound and d) water, wherein a mixture of catalyst system and solvent is initially charged and the 1,3-butadiene is metered into this mixture, wherein the polymerization is carried out at a pressure of from 2 to 7 bar.

2. The method according to claim 1, wherein the polymerization is carried out at a pressure of from 3 to 7 bar.

3. The method according to claim 1, wherein the polymerization is carried out at a temperature of the reaction mixture of from 20 to 60° C.

4. The method according to claim 1, wherein the cobalt compound is cobalt 2-ethylhexanoate.

5. The method according to claim 1, wherein the organophosphorus compound is tris(2,4-di-tert-butylphenyl) phosphite or tris(ortho-phenylphenyl) phosphite.

6. The method according to claim 1, wherein the organoaluminium compound is ethylaluminium sesquichloride or diethylaluminium chloride.

7. The method according to claim 1, wherein the molar ratio of cobalt compound to total amount of 1,3-butadiene used is from 1:2500 to 1:15,000.

8. The method according to claim 1, wherein the cobalt compound is cobalt 2-ethylhexanoate.

9. The method according to claim 1, wherein the organophosphorus compound is tris(2,4-di-tert-butylphenyl) phosphite or tris(ortho-phenylphenyl) phosphite.

10. The method according to claim 3, wherein the organoaluminium compound is ethylaluminium sesquichloride or diethylaluminium chloride.

11. The method according to claim 3, wherein the molar ratio of cobalt compound to total amount of 1,3-butadiene is from 1:2500 to 1:15,000.

12. The method according to claim 1, wherein the polybutadiene has a viscosity of 2000 to 8000 mPa s at 20° C.

13. The method according to claim 1, wherein the polybutadiene has a dispersity of 2.1 to 3.0.

14. The method according to claim 1, wherein the proportion of monomer units of the formula (A) in the entirety of the monomer units derived from 1,3-butadiene present in the polybutadiene is 50 to 65 mole percent, the proportion of units of the formula (B) in the entirety of the monomer units derived from 1,3-butadiene present in the polybutadiene is 2 to 6 mole percent and the proportion of monomer units of the formula (C) in the entirety of the monomer units derived from 1,3-butadiene present in the polybutadiene is 25 to 40 mole percent, wherein the entirety of the monomer units (A), (B) and (C) add up to 100 mole percent, and the polybutadiene has a number-average molar mass of 1200 to 1700 g/mol.

15. A product comprising the polybutadiene according to the method of claim 1 wherein the product is selected from the group consisting of rubber, synthetic rubber, tyres, adhesive formulations, coating compositions, flexographic printing plates, coating agents, coating agent components, and plasticizers.

16. A composition comprising the polybutadiene according to the method of claim 1 or conversion products of polybutadiene with other compounds.

17. The composition according to claim 16, wherein the proportion of the polybutadiene, which are present in the composition or were used for preparing the conversion products, based on the composition, is from 0.1 to 90% by weight.

18. The method according to claim 1, wherein said polybutadiene has a dispersity of 2.1 to 3.0.

19. The composition according to claim 16, wherein the polybutadiene has a viscosity of 2000 to 8000 mPa s at 20° C.

20. The composition according to claim 16, wherein the polybutadiene has a dispersity of 2.1 to 3.0.

* * * * *